United States Patent [19]

Pinchuk et al.

[11] Patent Number: 4,913,874
[45] Date of Patent: Apr. 3, 1990

[54] PROCESS OF PROVIDING TUBULAR POLYMERIC ANTICORROSION FILM

[76] Inventors: Leonid S. Pinchuk, ulitsa Petchenko, 14, kv. 17; Elena N. Aleshkevich, ulitsa Jubileinaya, 4, kv. 99; Viktor A. Goldade, ulitsa Kozhara, 5, kv. 30; Semen Y. Liberman, ulitsa B.Khmelnitskogo, 108, kv. 27; Grigory V. Rechits, ulitsa Fedjuninskogo, 6, kv. 88; Ekaterina I. Parkalova, ulitsa Fedjuninskogo, 6, kv. 82, all of Gomel, U.S.S.R.

[21] Appl. No.: 313,595

[22] Filed: Feb. 21, 1989

[51] Int. Cl.$^4$ .................. B05D 7/26; B29C 55/28
[52] U.S. Cl. .................. 264/564; 264/129; 264/173; 264/209.1; 264/211; 427/393.5
[58] Field of Search .................. 264/129, 173, 209.1, 264/211, 211.12, 564; 427/393.5, 424; 156/90

[56] References Cited

U.S. PATENT DOCUMENTS 3,260,776 7/1966 Lindstrom, Jr. et al. ...... 264/129 X
4,124,549 11/1978 Hashiudo et al. .............. 264/211 X
4,605,574 8/1986 Yonehara et al. ................ 427/424

FOREIGN PATENT DOCUMENTS 58-91726 5/1983 Japan .................. 427/393.5
859178 8/1981 U.S.S.R. .
768225 11/1986 U.S.S.R. .

Primary Examiner—Jeffery Thurlow
Assistant Examiner—Leo B. Tentoni
Attorney, Agent, or Firm—Lilling & Greenspan

[57] ABSTRACT

A process of producing a tubular polymeric anticorrosion film which includes extrusion of a mixture of a thermoplastic polymer with a corrosion inhibitor in a liquid phase or with a solution thereof in a plastifying agent employed in an amount exceeding the limit of compatibility with the polymer, blowing this melt into a tubular film upon cooling, application of a layer of an enamel or a varnish incompatible with the thermoplastic polymer onto the external surface of the formed tubular film before the line of crystallization, which layer has a difference of the solubility parameters in respect of said corrosion inhibitor or a solution thereof in a plastifying agent of not more than 8.

5 Claims, No Drawings

PROCESS OF PROVIDING TUBULAR POLYMERIC ANTICORROSION FILM

BACKGROUND OF THE INVENTION

1. Field of the Invention the present invention relates to corrosion protection by means of chemically resistant materials insulating metal articles from the atmospheric factors and aggressive media; and more particularly, it relates to a process for producing a tubular polymeric anticorrosion film.

The tubular polymeric anticorrosion film produced by the process according to the present invention can be useful as a preservation packaging material for the protection of metal articles from atmospheric factors.

2. Description of the Prior Art

Known in the art is the most widespread method for the protection of metals against corrosion which resides in preservation and packing of metal articles in sealed packages made from polymeric films possessing anticorrosion properties. Most widely used in the production of tubular polymeric anticorrosion films are the methods comprising extrusion of compositions incorporating volatile or contact-type inhibitors of corrosion of metals.

Known in the art is a process for producing a tubular anticorrosion polymeric film by extrusion of a composition based on polyethylene containing powder-like volatile inhibitors - a mixture of inorganic salts of $\beta$-dicyclohexylamine, $\beta$-cyclohexylamonium nitrite and nitrosodicyclohexylamine.

The resulting melt is air-blown into a tube upon cooling.

The tubular film produced by this process incorporates a major portion of the corrosion inhibitor in an encapsulated form so that the inhibitor is released upon its use on both sides. This results in impaired anticorrosion properties of the film and counterproductive losses of the corrosion inhibitor.

Known in the art is a process for the manufacture of a tubular polymeric anticorrosion film comprising extrusion of a melt of polmethylene and blowing of this melt into a tube simultaneously with application of a finely-divided corrosion inhibitor onto the inside surface of the formed tube by means of compressed air (SU, A, No. 859178).

Due to insufficient diffusion of the powder of the corrosion inhibitor into the volume of the film and its low adherence to the film, the latter has but a limited time of corrosion protection. Furthermore, the range of such corrosion inhibitors is rather narrow, therefore this prior art process has not found a wide commercial application.

Known in the art is a process for the manufacture of a double-layer polymeric anticorrosion film residing in that a film from a composition based on polyethelene and volatile corrosion inhibitors is laminated, on the side preliminarily coated with an adhesive, with a usual polymeric film. The process is rather complicated, features a high labor and material intensity.

Also known in the art is a process for the production of a tubular polymeric anticorrosion film (SU, A, No. 768225) which comprises extrusion of a melt of a mixture of a thermoplastic polymer with a corrosion inhibitor in a liquid phase or with its solution in a plastifying agent in an amount exceeding the limit of compatibility with this polymer, followed by blowing the melt into a tube upon cooling.

This process also features non-productive losses of the corrosion inhibitor due to its liberation and evaporation on both sides of the tubular film. This also causes reduction of the duration of corrosion protection of metal articles ensured by such film employed for packing of the articles.

SUMMARY OF THE INVENTION

It is an object of the present invention to provide such a process for the manufacture of a tubular polymeric anticorrosion film which would make it possible to reduce the non-productive loses of the corrosion inhibitor and to obtain a film having an extended duration of corrosion protection.

This object is accomplished by the provision of a process of producing a tubular polymeric anticorrosion film comprising extrusion of a melt of a mixture of a thermoplastic material with a corrosion inhibitor in a liquid phase or with a solution thereof in a plastifying agent taken in an amount exceeding its limit of compatibility with the above-mentioned polymer, followed by blowing the melt into a tube upon cooling. According to the present invention, onto the outside surface of the shaped tube before the crystallization line a layer of a varnish or of an enamel incompatible with the above-mentioned thermoplastic polymer is applied, the varnish or the enamel having a difference of solubility parameter relative to the above-mentioned corrosion unhibitor or its solution in a plastifying agent of less than 8.

The process for producing a tubular polymeric anicorrosion film according to the present invention is simple as to its procedure and equipment employed and makes it possible to obtain the following advantages:

to extend the duration of corrosion protection of the polymeric film upon use thereof for packaging and preservation of metal articles;

to lower non-productive losses of corrosion inhibitors due to their evolution only on the inner side of the tubular film, thus improving the conditions of labor upon packaging of metal articles into a film incorporating toxic inhibitors;

to ensure the possibility of marking the film by means of varnishes and enamels of different colors, as well as to impart a decorative appearance to the packing by means of paint-and-varnish material incompatible with the materials constituting the base of the film.

DETAILED DESCRIPTION OF THE INVENTION

The present invention resides in that shaped tubular film incorporates the components which, while being combined with the applied varnish and enamel, make it possible to apply a coating onto the external surface of this film made from a thermoplastic polymer insoluble by these varnishes and enamels.

The process according to the present invention can be further explained as follows. Upon extrusion of a mixture consisting of a thermoplastic polymer and a specified amount of components (compatible with it) in a liquid phase (i.e., corrosion inhibitors or solutions thereof in plastifying agent), the polymeric material passes into a gel-like state. For the polymeric gel the presence of a polymeric matrix is characteristic which has a system of communicating pores with a size of 10 to 30 $\mu$m filled with the liquid components (dispersion liquid). The process of spontaneous separation of the liquid from the matrix (so-called syneresis) explains to a considerable extent the combination of anticorrosion and processing properties of the corrosion-protecting films. By adding, into a dispersion liquid, antiseptic compounds and adhesives, packaging films are obtained which possess, in addition to anticorrosion properties, for example, preserving and sealing properties as well.

In many cases anticorrosion properties of such films are due to the kinetics of separation of the volatile components, for example, corrosion inhibitors. For packing films it is essential that the separation of the volatile inhibitors take place only on that side thereof which faces the article to be packed. The keeping with this requirement provides a marked influence on the duration of the protective effect of packing films and, hence, on the time of storage of metal articles.

The process according to the present invention involves an operation of application of a layer of a varnish or of an enamel onto the outer surface of the tube formed from a thermoplastic polymer prior or the line of its crystallization, i.e. during the residence of this polymer in the gel-like condition.

The purpose of this operation is to prevent the release of a volatile corrosion inhibitor or of its solution in a plastifying agent on the external side of the tubular polymeric film. To solve this problem, it is sufficient to block the outlet openings of the communicating pores in the polymeric matrix. The specific feature of the process consists in that the film structure makes it possible to use varnishes and enamels which do not dissolve the polymeric matrix. An indispensible requirement imposed on them is compatibility with the dispersion liquid of the polymeric matrix which is determined by the difference of the solubility parameters of these varnishes or enamels and of the above-mentioned liquid which difference should not be more than 8.

Provided that this condition is fulfilled, the applied liquid while flowing down the outside surface of the film does not wet the polymeric matrix of the gel, but gets retained in the regions of the film surface, on which the components of the liquid phase are given off. The varnishes and enamels penetrate into pores of the polymeric matrix according to a diffusion mechanism and, while being congealed therein, form a kind of plugs which hinder the release of the dispersion liquid onto the film surface on the external side of the tubular film. In this manner, the migration of the corrosion inhibitor to the external surface of the film becomes hindered.

Since the solubility of substances is increased with decreasing difference in their solubility parameters:

$$\delta = (E/V)^{\frac{1}{2}},$$

wherein E and V are respectively the energy of evaporation and the molar volume of the component, the highest effect in the process according to the present invention is attained at $\delta_1 - \delta_2 = 0$, wherein $\delta_1$- solubility parameter of the dispersion liquid, $\delta_2$ is solubility parameter for the enamel or varnish. At values of $\delta_1 - \delta_2 > 8$ the coating on the external surface of the tubular film has but an insufficient adherence, therefore the corrosion inhibitor or its solution in a plastifying agent gets released onto the above-mentioned surface of the film.

The process for the production of a tubular polymeric anticorrosion film is performed in the following manner. A mixture of a thermoplastic polymer with a solution of a corrosion inhibitor in a plastifying agent is extruded through a slit die; at the outlet thereof the melt is air-blown into a tubular film simultaneously with cooling thereof. The application of a paint-and-varnish coating onto the external surface of the formed tubular film is effected in the region of from the Outlet of the melt from the extrusion die to the line of the film crystallization.

The melt temperature at the outlet from the extrusion die exceeds the melting temperature of the polymer by 30°–80° C. The formed film leaving the extrusion die has a temperature above the melting (flowing) temperature of the polymer during the period of tube blowing (5–10 s). At this time the film is in the state of a colloidal solution of the polymer with the components in the liquid phase.

Upon cooling after passing the crystallization line, the colloidal solution turns into a gel with its pores filled with a solution of the corrosion inhibitor in the plastifying agent. The application of a coating onto the outside surface results in penetration of the varnish or enamel into the film pores and blocking thereof on the external surface of the tubular film.

Consequently, evaporation of the inhibitor from the outside surface of the polymeric tubular film will be substantially stopped.

The coatings are dried during the process of air-blowing of the tubular film by way of purging air over the tubular film at a temperature of by 50°–60° C. above the line of the melt crystallization. The coating is applied onto the tubular film at a temperature of the varnish or enamel of from 20° to 50° C., the rate of application of the varnish or enamel being varied within the range of from 2 to 10 g/m² of the film.

As the thermoplastic polymers use is made of low-density polyethylene (PE) ($\rho = 900$–939 kg/m³), polypropylene (PP) ($\rho = 900$–910 kg/m³) and suspension polyvinylchloride (PVC) ($\rho = 1,390$–1,400 kg/m³).

As the plastifying agents it is advisable to use the following process liquids conventionally denoted by letters "a", "b" and "c":

a - distillate mineral oil of a high degree of purity having the following characteristics: density at 20° C.- 0.894 g/cm³, viscosity at 20° C.-49×10⁻⁶ m²/s, at 50° C.-20×10⁻⁶ m²/s, congelation temperature - (−45° C.), flash point in an open cup -−163° C.;

b - mineral oil of a selective purification without additives produced from low-sulphur paraffin and low-paraffin crudes which has the following characteristics: density at 20° C.-0.89 g/cm³, viscosity at 20° C.- 14.×10⁻⁶ m²/s, ash-content - - maximum 0.003%, acid number - 0.25 mg KOH/g, congelation temperature - (−30° C.), flash point in a closed cup - 200° C.

c - metacresol (CH₃C₆H₄OH), m.p. 11° C., b.p. 203° C.; soluble in water, alcohols, benzene, chloroform, acetone.

As the corrosion inhibitors use can be made of, or example, the following products conventionally denoted by letters "A", "B" and "C";

A - yellow to light-brown liquid based on a commercial fraction of secondary amines of fatty acids and acrilic acid nitrile with the general structural formula:

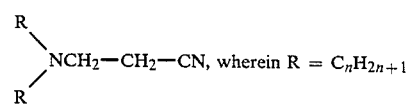

n=7-9; density at 20° C.-0.85 g/cm³, viscosity at 40° C.-6×10⁻⁶ m²/s, congelation temperature -(−40° C.), boiling temperature under the pressure of 1.33 kPa, -190° C., self-inflammation temperature — 260° C.; soluble in oils, organic solvents, volatility at 20° C.-13.3 Pa;

B - a mixture of dicyclohexylamine salts (43% by mass) and of synthetic fatty acids $C_{10}$–$C_{20}$ (57% by mass) of the general formula: $(C_6H_{11})NHC_nH_{2n+1}COOH$, comprising a paint-like product with the density of 0.92 g/cm³ with the melting temperature of 15°-20° C., soluble in oils and organic solvents; the volatility at 20° C. 0.013 Pa;

C - a salt of cyclohexylamine and synthetic fatty acids with a number of carbon atoms in a chain of from 7 to 11 $(C_nH_{2n+1}COOC_6H_{11}NH_2)$; comprises a paste-like product of a light-brown colour, with the congelation temperature of −12° C. in alcohols, mineral oils, gasoline, acetone.

For the application of coatings onto a tubular polymeric film use can be made of, for example, the following materials conventionally denoted by letters L, M, N:

L - solution of cellulose nitrate in a mixture of solvents and diluents with the addition of a plastifying agent; a transparent liquid, the dry solids content is of at least 19%;

M - enamel based on an alkyd resin and a low-butanolized resin with a pigment such as zinc whites with a particle size of 0.1 to 5.0 μm.

N - pentaphthalic enamel comprising a suspension of titanium dioxide of the rutile form and other pigments and fillers in a pentaphthalic varnish with the addition of solvents.

In the assessment of properties of the tubular polymeric anticorrosion film produced by the process according to the present invention and by conventional processes, taken into consideration are the appearance of the coating, its adherence to the film and anticorrosion properties of this film.

The anticorrosion properties of the films are evaluated by the accelerated-test method. To this end, steel samples (from a carbon steel with a content of carbon of 0.05 to 0.11% by mass) with the size of 25×25×0.8 mm are mechanically cleaned to remove the products of corrosion, washed with ethanol, treated with a 5% solution of NaOH in tbe presence of a granulated zinc at a temperature of 80°-90° C. for 30 minutes. Then the samples are again washed with ethanol and distilled water and dried. Thereafter, the steel samples are tightly sealed into a manufactured polymeric anticorrosion film, placed into a weathering cabinet and subjected to cyclic heating to the temperature of 40±2° C. with residence at this temperature for 8 hours, while in the remaining time of the day cooling to room temperature at the air humidity of 100%.

The results of the comparative tests of the films produced by different processes were expressed in points to evaluate the degree of corrosion damage of steel samples packed in these films. The degree of corrosion damage was determined by the area of corrosion injury on the surface of metal samples against a 10-points scale as it is shown in Table 1 hereinbelow. In so doing, as the corrosion injuries considered are corrosion foci on the su face of a metal sample in the form of individual points, spots, threads, ulcers, as well as variation of the colour and gloss of the surface.

TABLE 1

| Area of corrosion injuries, percent | Points |
| --- | --- |
| 1 | 2 |
| 0 | 0 |
| 0–0.05 | 1 |
| 0.05–0.10 | 2 |
| 0.10–0.30 | 3 |
| 0.30–0.50 | 4 |
| 0.50–1.00 | 5 |
| 1.00–3.00 | 6 |
| 3.00–5.00 | 7 |
| 5.00–10.00 | 8 |
| 10.00–30.00 | 9 |
| 30.00–50.00 and over | 10 |

For a better understanding of the present invention, some specific examples illustrating the process according to this invention are given hereinbelow.

EXAMPLE 1

For the production of a tubular polymeric anticorrosion film extruded is a composition containing 85% by mass of low-density polyethylene (PE) and a solution of 5% by mass of the inhibitor "A" in 10% by mass of the plastifying agent "a" with δ=17.48. The temperature in the extrusion die is maintained at 140° C. St the outlet of the extrusion die the resulting melt is air blown into a tubular film simultaneously with spraying the varnish "L" onto its outside surface prior to the crystallization line which is at the distance of 60 cm from the extrusion die. The varnish "L" has δ=19.93. The coefficient of the melt blowing-up into the tubular film is equal to K=D/d=4 therein D is the diameter of the formed tube, d - diameter of the shaping slit in the die; speed of the longitudinal stretching $V = V_1/V_2 = 6$, wherein $V_1$-speed of the film leaving the drawing rolls, $V_2$-speed of extrusion.

The resulting tubular film has a protection layer on its outside surface which prevents the release and evaporation of the Volatile inhibitor "A". The anticorrosion properties of the film are shown in Table 2 hereinbelow.

EXAMPLE 2

A tubular polymeric anticorrosion film is produced in a manner similar to that described in the foregoing Example 1. The composition to be extruded consists of polypropylene (PP) and a solution of the inhibitor "B" in the plastifying agent "b" having δ=26.36; the temperature in the extrusion die is maintained at 250° C.; onto the outside surface of the formed tubular film the enamel "M" is sprayed which has δ=18.36. The protective layer prevents the release and evaporation of the volatile inhibitor "B". The anticorrosion properties of the film are shown in Table 2 hereinbelow.

EXAMPLE 3

A tubular polymeric anticorrosion film is produced in a manner similar to that described in Example 1 hereinbefore. The extruded composition consists of polyvinylchloride (PVC) and a solution of the inhibitor "C" in the plastifying agent "c" having δ=22.56. The temperature of the extrusion die is kept at 115° C. and onto the external surface of the formed tubular film the enamel "N" is applied by spraying, its δ=15.75. The layer of this enamel prevents the film from the release and evaporation of the volatile inhibitor "c". the anticorrosion properties of the resulting tubular polymeric film are shown in Table 2 hereinbelow.

EXAMPLE 4

A tubular polymeric anticorrosion film is produced by the process described in SU, A, No. 768225. To this end, a film is extruded in a manner similar to that described in Example 1 hereinbefore, except that no coating of an enamel of varnish is applied onto the tubular film. The resulting film has no protective layer on its surface which would prevent the release of the corrosion inhibitor. The anticorrosion properties of the film are shown in Table 2 hereinbelow.

EXAMPLE 5 (COMPARATIVE)

A tubular polymeric film is produced from lowdensity polyethylene without any corrosion inhibitor but following the procedure described in Example 1. The anticorrosion properties of the thus-produced film are shown in Table 2.

EXAMPLE 6 (COMPARATIVE)

A polymeric tubular film is produced as in Example 5 hereinabove, except that onto the external surface of the formed tubular film before the crystallization line (60 cm) the varnish "L" is applied by spraying. The anticorrosion properties of the resulting film are shown in Table 2 hereinbelow.

EXAMPLE 7 (COMPARATIVE)

A tubular polymeric film is produced as in Example 1 hereinbefore, except that the varnish "L" is applied by spraying above the line of crystallization. The anticorrosion properties of the thus-produced tubular polymeric film are shown in Table 2 hereinbelow.

TABLE 2

| Film of Example No. | Degree of corrosion damage-in points, after testing the samples, for a number of days: | | | | | |
| --- | --- | --- | --- | --- | --- | --- |
| | 5 | 10 | 15 | 20 | 25 | 30 |
| 1 | 0 | 0 | 0 | 0 | 0 | 0 |
| 2 | 0 | 0 | 0 | 0 | 0 | 0 |
| 3 | 0 | 0 | 0 | 0 | 0 | 0 |
| 4 | 0 | 0 | 0 | 1 | 1 | 2 |
| 5 | 1 | 3 | 5 | 6 | 6 | 7 |
| 6 | 1 | 2 | 5 | 5 | 6 | 6 |
| 7 | 0 | 0 | 0 | 1 | 2 | 3 |

The results shown in the above Table 2 demontrate that the most satisfactory anticorrosion properties are inherent in the film produced by the process according to the present invention (Examples 1 through 3): no corrosion injury of he samples packaged into it is found. At the same time, the samples packed into the film produced by the process according to SU, A, No. 768225 (Example 4) already after 20 days of testing show the traces of corrosion. The polyethylene film without an inhibitor (Example 5) and even the film with a coating applied thereonto (Example 6) do not ensure preservation of the steel samples packed thereinto.

For the purpose of comparison, shown in Table 2 are anticorrosion properties of the film with a coating applied onto the tube above the crystallization line (Example 7). In this case the film does not substantially differ in its properties from the film produced by the process disclosed in SU, A, No. 768225.

The coatings on a polyethylene film which are formed by any of the varnishes or enamels according to the present invention (see Example 6) are peeled from the supporting film upon testing by the method of notching. The varnishes and enamels do not wet the film and form voids and bruises. On the films produced by the process according to the present invention (Examples 1 through 3) the coatings have a uniform thickness and do not peel upon application of a notch-screen cuttings.

Therefore, the tubular polymeric anticorrosion film produced by the process according to the present invention has a long-time duration of corrosion protection which is ensured by a rational use of the inhibitor incorporated in the film structure, as well as by reduction of a non-productive consumption of the inhibitor through the external surface of the polymeric tubular film. Furthermore, the process according to the present invention is rather simple as regards its procedure and the equipment employed.

What is claimed is:

1. A process of producing a tubular polymeric anticorrosion film comprising the steps of:
    extruding a melt of a mixture of a thermoplastic polymer with one of a corrosion inhibitor in a liquor phase and a corrosion inhibitor in liquid phase with a solution thereof in a plastifying agent employed in amounts exceeding a limit of compatibility with said polymer;
    blowing said melt into a tubular film upon cooling; and
    applying, onto an external surface of the formed tubular film before a line of crystallization, of a layer of one of an enamel and a varnish incompatible with said thermoplastic polymer having a difference of solubility parameters in respect of said one of a corrosion inhibitor in a liquid phase and a corrosion inhibitor liquid phase with a solution thereof in a plastifying agent of less than 8.

2. A process of producing a tubular polymeric anticorrosion film comprising the steps of:
    extruding a melt of a mixture of a thermoplastic polymer with a corrosion inhibitor in a liquid phase employed in amounts exceeding a limit of compatibility with said polymer;
    blowing said melt into a tubular film upon cooling; and
    applying onto an external surface of the formed tubular film before a line of crystallization, of a layer of an enamel incompatible with said thermoplastic polymer having a difference of solubility parameters in respect of said corrosion inhibitor of less than 8.

3. A process as defined in claim 2, further comprising the step of forming a solution of said corrosion inhibitor in liquid phase in a plastifying agent prior to said extruding step.

4. A process of producing a tubular polymeric anticorrosion film comprising the steps of:
    extruding a melt of a mixture of a thermoplastic polymer with a corrosion inhibitor in a liquid phase employed in amounts exceeding a limit of compatibility with said polymer;
    blowing said melt into a tubular film upon cooling; and
    applying onto an external surface of the formed tubular film before a line of crystallization, of a layer of a varnish incompatible with said thermoplastic polymer having a difference of solubility parameters in respect of said corrosion inhibitor of less than 8.

5. A process as defined in claim 4, further comprising the step of forming a solution of said corrosion inhibitor in liquid phase in a plastifying agent prior to said extruding step.

* * * * *